(Model.)

B. C. SENTON.
Vibrating Propeller.

No. 232,076.        Patented Sept. 7, 1880.

WITNESSES:
A. Schehl.
C. Sedgwick

INVENTOR:
B. C. Senton
BY Munn &C.
ATTORNEYS.

UNITED STATES PATENT OFFICE.

UNITED STATES PATENT OFFICE.

BENJAMIN C. SENTON, OF WHITEHALL, NEW YORK.

VIBRATING PROPELLER.

SPECIFICATION forming part of Letters Patent No. 232,076, dated September 7, 1880.

Application filed June 30, 1880. (Model.)

*To all whom it may concern:*

Be it known that I, BENJAMIN C. SENTON, of Whitehall, in the county of Washington and State of New York, have invented a new and useful Improvement in Propellers for Vessels, of which the following is a specification.

The object of my invention is to furnish a propelling device especially adapted for propelling vessels in shallow waters and canals;
and my invention consists in reversing mechanism by which the paddle-shaft may be turned, so that the paddles reverse their action, all as described in detail hereinafter with reference to the accompanying drawings, forming part of this specification.

Figure 1:
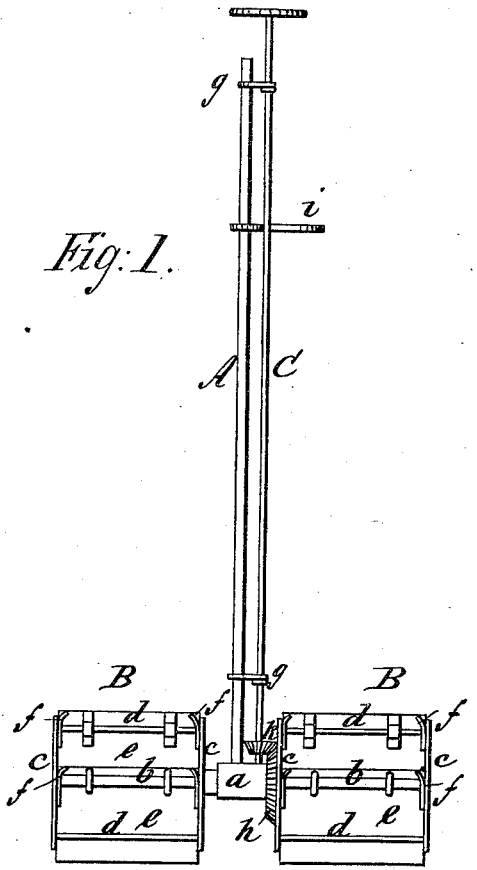
Figure 2:
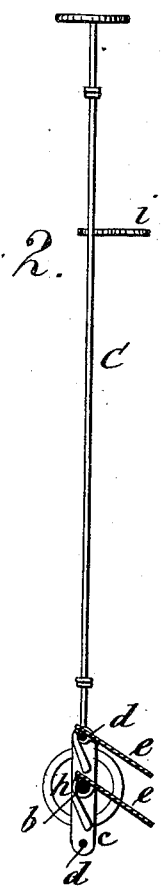

In the drawings, Figure 1 is a rear elevation of my propeller. Fig. 2 is a side elevation with one paddle in section.

Similar letters of reference indicate corresponding parts.

A is a vertical shaft provided at its lower end with a box, $a$, for a cross-shaft, $b$, which is thereby supported in a horizontal position, so as to move with shaft A, and at the same time be capable of rotation in the box $a$.

B B are the paddles secured on the two ends of shaft $b$. Each paddle consists of a rectangular frame formed of radial arms $c$, and cross-bars $d$, and leaves $e\ e$, that are hung one on the upper bar, $d$, and the other on shaft $b$, so that the leaves may open and close. Upon the paddle-frames are fixed stops $f\,f$, which limit the opening movement of the leaves $e$.

C is a shaft stepped in box $a$, and supported in bearings $g$, that are fixed on shaft A, so that shaft C is carried by shaft A, and may also revolve freely. On the lower end of shaft C is fixed a bevel-pinion, $k$, that meshes with a similar pinion, $h$, that is secured on shaft $b$.
The upper end of shaft C is fitted with a hand-wheel, whereby it may be turned to revolve the shaft $b$, and thus reverse the paddles. A suitable stop device will be used to prevent the shaft C from turning while the paddles are in motion.

The shaft A is to be supported by suitable hangers at the bow of a vessel, and fitted to be raised and lowered for regulating the depth to which the paddles enter the water. The shaft is to be vibrated by connections to an engine, so that the paddles shall move back and forth through an arc, say, of ninety degrees. I have shown at $i$ an arm attached on shaft A for connection of power.

It will be seen that the paddles, being vibrated as described, act against the water when moving in one direction, and the leaves open when moving in the other direction, so that the power is exerted to propel the vessel in one direction, and by having two paddles a continuous action is obtained.

I have obtained more satisfactory results by placing the paddles at the bow instead of the stern, besides which no changes are required in the steering mechanism nor in the shape of the stern.

Two or more leaves may be used on each paddle, and the cross-shaft made of any suitable length. These paddles act with but slight disturbance of the water, and are thereby especially adapted for canal navigation.

Having thus described my invention, what I claim as new, and desire to secure by Letters Patent, is—

The shaft C and gearing $h\ k$, combined with the paddle-shaft $b$, that is fitted for rotation in box $a$, substantially as and for the purposes set forth.

BENJAMIN CLARENCE SENTON.

Witnesses:
 L. CORBETT,
 DEWITT C. SMITH.